United States Patent [19]

Pav et al.

[11] Patent Number: 4,639,346

[45] Date of Patent: Jan. 27, 1987

[54] METHOD AND APPARATUS FOR CALENDERING MAGNETIC TAPES

[75] Inventors: Josef Pav; Richard Rauf, both of Krefeld; Peter Svenka, Grefrath; Reinhard Wenzel, Krefeld, all of Fed. Rep. of Germany

[73] Assignee: Kleinewefers GmbH, Krefeld, Fed. Rep. of Germany

[21] Appl. No.: 726,068

[22] Filed: Apr. 23, 1985

[30] Foreign Application Priority Data

May 2, 1984 [DE] Fed. Rep. of Germany ....... 3416211

[51] Int. Cl.$^4$ .................. B29B 13/02; B29C 43/24; B29C 43/46

[52] U.S. Cl. ............... 264/280; 29/116 AD; 264/40.6; 264/40.7; 264/175; 425/143; 425/367; 425/368; 425/DIG. 235; 427/130

[58] Field of Search ............ 264/280, 2.7, 284, 313, 264/314, 40.6, 40.7, 175; 425/363, 367, DIG. 235, 368, 143; 29/116 AD; 427/130

[56] References Cited

U.S. PATENT DOCUMENTS 3,074,114 1/1963 Petry ........................ 264/280 X
3,254,593 6/1966 Beachler .................... 100/38
3,358,321 12/1967 Seanor et al. .......... 425/DIG. 235 X
4,124,349 11/1978 Lehmann ..................... 425/367
4,520,723 6/1985 Pav et al. .................. 29/116 AD X

FOREIGN PATENT DOCUMENTS 1113357 8/1961 Fed. Rep. of Germany .

Primary Examiner—Donald Czaja
Assistant Examiner—Leo B. Tentoni
Attorney, Agent, or Firm—Peter K. Kontler

[57] ABSTRACT

A magnetic audio or video tape is smoothed and/or otherwise treated by causing it to pass through one or more calenders wherein a large-diameter primary calender roll is heated from within and the major part of its peripheral surface is surrounded by the running tape. The primary roll rotates about a fixed axis and is surrounded by a cluster of two or more smaller-diameter secondary calender rolls each of which has a viscoelastic peripheral layer and each of which can be individually biased against the adjacent portion of the running tape with a selected force. The magnetic film on the tape is out of contact with the secondary rolls as well as with the guide rollers which cause the tape to advance toward the peripheral surface of the primary roll and thereupon toward a takeup reel.

27 Claims, 3 Drawing Figures

METHOD AND APPARATUS FOR CALENDERING MAGNETIC TAPES

BACKGROUND OF THE INVENTION

The present invention relates to the art of calendering in general, and more particularly to improvements in a method of and an apparatus for calendering webs of synthetic plastic material. Still more particularly, the invention relates to improvements in a method of and an apparatus for calendering tapes of synthetic plastic material one side of which is coated with a layer or film of magnetic material. Typical examples of such webs are magnetic audio and video tapes.

It is already known to treat magnetic audio and video tapes in a calender wherein successive increments of the tape are caused to pass through several nips which are defined by pairs of calendering rolls and wherein the tape is heated in the course of the actual calendering operation, i.e., during passage through the nips. As a rule, a magnetic audio or video tape contains a very thin web of synthetic plastic material (the thickness is normally in the range of less than 10 $\mu$m) one side of which is coated with pulverulent magnetic material in a suitable binder. The calendering operation is intended to bring about an equalization of the thickness of the applied magnetic film as well as to enhance the smoothness of the exposed side of the film. Heretofore known calenders which are used for the treatment of magnetic tapes comprise a stack of superimposed calender rolls and a set of guide rollers which are adjacent to the nips between neighboring calendering rolls of the stack and direct successive increments of the running tape into the adjacent nips. At least some of the calender rolls have rims which consist of or contain a viscoelastic natural or synthetic material. The rims of the remaining calender rolls are hard; they are made of steel or constitute hard casting made of a suitable metallic material. Some of the calender rolls are heated, for example, by causing a gaseous or liquid heat exchange medium to flow therethrough. In other words, the calender is designed in such a way that it heats spaced-apart portions of the running magnetic tape.

The just discussed calenders have been found to ensure a reasonably satisfactory treatment of magnetic tapes. However, the quality of the thus treated tapes is not uniform and it cannot be increased beyond a rather low average quality. In other words, there are limits as to the maximum achievable quality of magnetic tapes which are treated in accordance with the above outlined method and in the above described calenders.

German Auslegeschrift No. 11 13 357 discloses a calender wherein a primary calender roll having a soft elastomeric rim is surrounded by a set of four secondary or satellite calender rolls each of which has a hard metallic rim and each of which defines a nip with the adjacent portion of the peripheral surface of the primary roll. The German publication further discloses the possibility of heating the secondary calender rolls. A pair of neighboring secondary rolls is rotatable about fixed axes and the other two secondary rolls can be moved toward and away from the axis of the primary roll which floats between the four secondary rolls and bears against the secondary rolls of the pair with a force which is determined by the other two secondary rolls. The just described calender is designed primarily for the treatment of paper webs but mention is also made of the possibility of treating webs of synthetic material, webs of textile material or coated webs of flexible material without specifically mentioning magnetic audio and/or video tapes.

German Offenlegungsschrift No. 2 405 222 discloses a method and apparatus for treating magnetic video tapes by causing them to pass through the nip of a metallic roll and a second roll having an elastic rim made of polyurethane. Each of the rolls is movable at right angles to its axis and the metallic roll is heated so that the tape is heated during passage through the nip. The Offenlegungsschrift proposes to cool the second roll so as to prevent the temperature of its peripheral surface from rising above 100° C. The Shore hardness of the rim of the second roll is supposed to be between 75° and 85°, and the pressure in the nip should be in the range of between 150 and 300 kg/cm$^2$.

OBJECTS AND SUMMARY OF THE INVENTION

An object of the invention is to provide a novel and improved method of treating webs of synthetic plastic material, one side of which carries a magnetic film, in such a way that the smoothness and/or certain other desirable characteristics of the treated webs are superior to those of the webs which are treated in accordance with heretofore known proposals.

Another object of the invention is to provide a novel and improved method of uniformizing the quality of a running magnetic audio or video tape in a single calendering operation.

A further object of the invention is to provide a method which can be practiced in connection with the treatment of wide or narrow magnetic tapes and which is not likely to entail any damage to the magnetic film.

An additional object of the invention is to provide a novel and improved calender for the practice of the above outlined method.

Still another object of the invention is to provide a calender which can treat successive increments of a running magnetic audio or video tape in any desired number of stages.

A further object of the invention is to provide novel and improved rolls for use in the above outlined calender.

An additional object of the invention is to provide a novel and improved system of guide means for the magnetic tape in the above outlined calender.

Another object of the invention is to provide a calender which can be readily adjusted to treat wide or narrow magnetic tapes as well as to alter the nature of treatment to which a tape is to be subjected in a number of different ways.

One feature of the invention resides in the provision of a method of calendering a web of the type having a magnetic film at one of its sides, particularly a method of calendering an audio or video recording tape. The method comprises the steps of advancing the web longitudinally in a predetermined direction and along an elongated path, training the web over at least one primary calendering roll in a predetermined portion of the path so that the magnetic film on successive elongated increments of the running web contacts the primary roll, establishing at least two spaced-apart nips between the primary roll and discrete secondary rolls so that spaced-apart portions of the aforementioned increments are compelled to advance through and are compressed in the nips, and heating the primary roll so that the latter exchanges heat with successive increments of the running web not only in the nips but also along those portions of the increments which extend between the nips. The primary calender roll is preferably mounted for rotation about a fixed axis.

The training step preferably includes maintaining each of the increments in uninterrupted contact with the primary calender roll in the entire predetermined portion of the elongated path.

The method can further comprise the step of regulating the pressure which is applied to the running web in at least one of the nips independently of the pressure in the other nip or nips. The method can also comprise the step of preheating the web ahead of the predetermined portion of the path, as considered in the predetermined direction. The training step can include guiding the web along at least one additional portion of the path (downstream and/or upstream of the predetermined portion) wherein the one (film-carrying) side of the web is convex.

Another feature of the invention resides in the provision of a calender for a web of the type having a magnetic film at one of its sides, particularly a calender for audio or video recording tape. The calender comprises a frame, a primary calender roll which is mounted in the frame for rotation about a fixed axis, at least two secondary calender rolls which are rotatably supported by the frame and define with the primary roll spaced-apart nips extending in parallelism with the axis of the primary roll, a takeup reel and a set of guide rollers or other suitable means for advancing the web longitudinally in a predetermined direction and along an elongated path a predetermined portion of which path extends along the major part of the periphery of the primary roll and through the aforementioned nips in such a way that the film-coated side of the running web contacts the peripheral surface of the primary roll but is out of contact with the secondary rolls, fluid-operated cylinder and piston units or other suitable means for moving at least one of the secondary rolls with reference to the primary roll so as to alter the pressure upon the running web in the respective nip, and means for heating the primary roll so that the latter exchanges heat with the running web in the entire predetermined portion of the path including the region or regions between the nips. The primary roll is or can be provided with a hard rim or shell having a smooth web-contacting peripheral surface. At least one of the secondary calender rolls preferably comprises an elastic web-contacting layer.

In accordance with a presently preferred embodiment of the calender, at least one of the secondary rolls comprises an elongated carrier which is movable by the respective moving means nearer to or further away from the axis of the primary roll, a deformable hollow cylindrical shell or rim which surrounds the carrier and has a web-contacting external surface, at least one row of displaceable supporting elements which are disposed between the deformable shell and the carrier, and fluid-operated motors or other suitable means for displacing the supporting elements relative to the carrier to thereby influence the shape of the external surface of the shell and the pressure between selected portions of such external surface and the adjacent longitudinally extending portions of the running web. Such calender preferably further comprises control means (e.g., including a computer) for operating the displacing means individually and/or in groups of two or more. The cylindrical shell of the one secondary calender roll preferably comprises an elastomeric peripheral layer which includes the aforementioned web-contacting external surface, and the control means preferably includes means for monitoring the temperature of the elastomeric layer at a plurality of locations which are spaced apart from one another, as considered in the axial direction of the one secondary roll. The supporting elements in the shell of the one secondary roll are adjacent to such locations and the control means includes means for actuating the corresponding displacing means in dependency on the variations of monitored temperature at the respective locations.

The advancing means for the web preferably includes at least one guide roll which serves to maintain the one side (i.e., the magnetic film) of the web in contact with the primary calender roll not only between the nips but also upstream of the foremost nip, as considered in the direction of advancement of the web. The advancing means preferably includes a plurality of rotary guide members which contact the other side of the running web.

The calender can comprise at least one additional secondary roll (i.e., at least one roll in excess of the minimum required number of secondary rolls) and means for moving the additional secondary roll relative to the primary roll so as to establish or terminate the establishment of an additional nip for the passage of the web. Such additional secondary roll can be used under certain circumstances to exert pressure upon the running web in addition to the pressure which is exerted by the normally employed secondary rolls, or can be used in lieu of a temporarily lifted regular secondary roll which requires inspection, cleaning, repair or replacement.

The diameter of the primary roll preferably exceeds the diameters of the secondary rolls, and the diameters of all secondary rolls may but need not be the same. The foremost secondary roll, as considered in the direction of advancement of the web, can have a hard shell or rim with a preferably smooth web-contacting external surface. The heating action of the primary calender roll is preferably regulated by the aforementioned control means in dependency on the results of temperature measurements at the external surface of the primary roll and/or at the external surface or surfaces of one or more secondary rolls and/or at the one and/or the other side of the web.

The improved calender can further comprise at least one second primary calender roll which is mounted in the frame for rotation about a fixed axis, at least two additional secondary calender rolls which are rotatably supported by the frame and define with the second primary roll spaced-apart additional nips extending in parallelism with the axis of the second primary roll, guide means for ensuring that successive increments of the web which were treated by the first mentioned primary calender roll in conjunction with the associated first mentioned secondary rolls contact the major part of the periphery of the second primary roll and pass through the additional nips whereby the one side of the web contacts the second primary roll but is out of contact with the additional secondary rolls, means for moving at least one of the additional secondary rolls relative to the second primary roll so as to alter the pressure upon the running web in the respective additional nip, and means for heating the additional primary roll to ensure that the second primary roll exchanges heat with the running web in each and every portion of the region of contact between the web and the periphery of the second primary roll. The number of additional secondary rolls may but need not match the number of secondary rolls which cooperate with the first mentioned primary roll.

The novel features which are considered as characteristic of the invention are set forth in particular in the appended claims. The improved calender itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
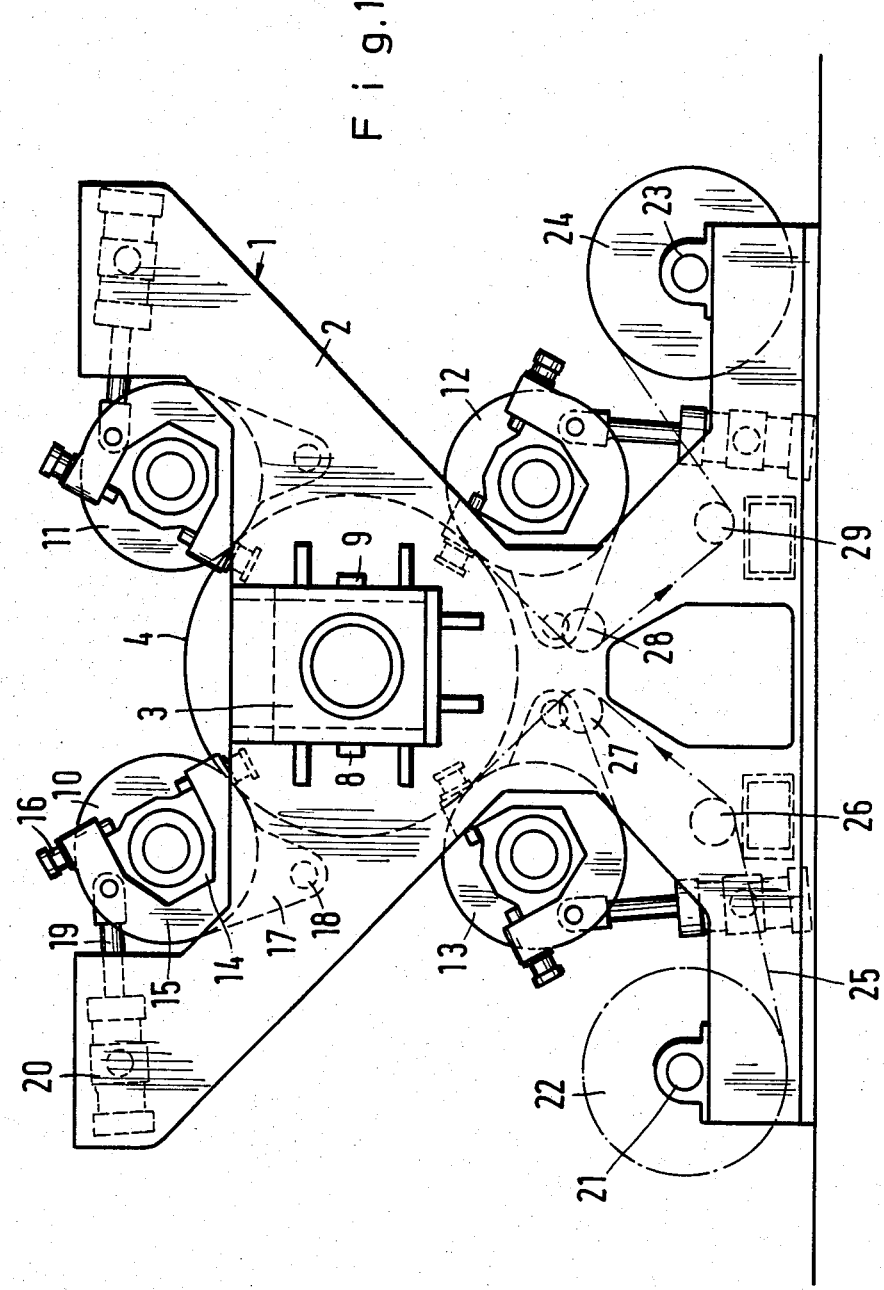
FIG. 1 is a schematic side elevational view of a calender which embodies one form of the invention and includes a single primary calender roll with a cluster of four secondary calender rolls.
Figure 2:
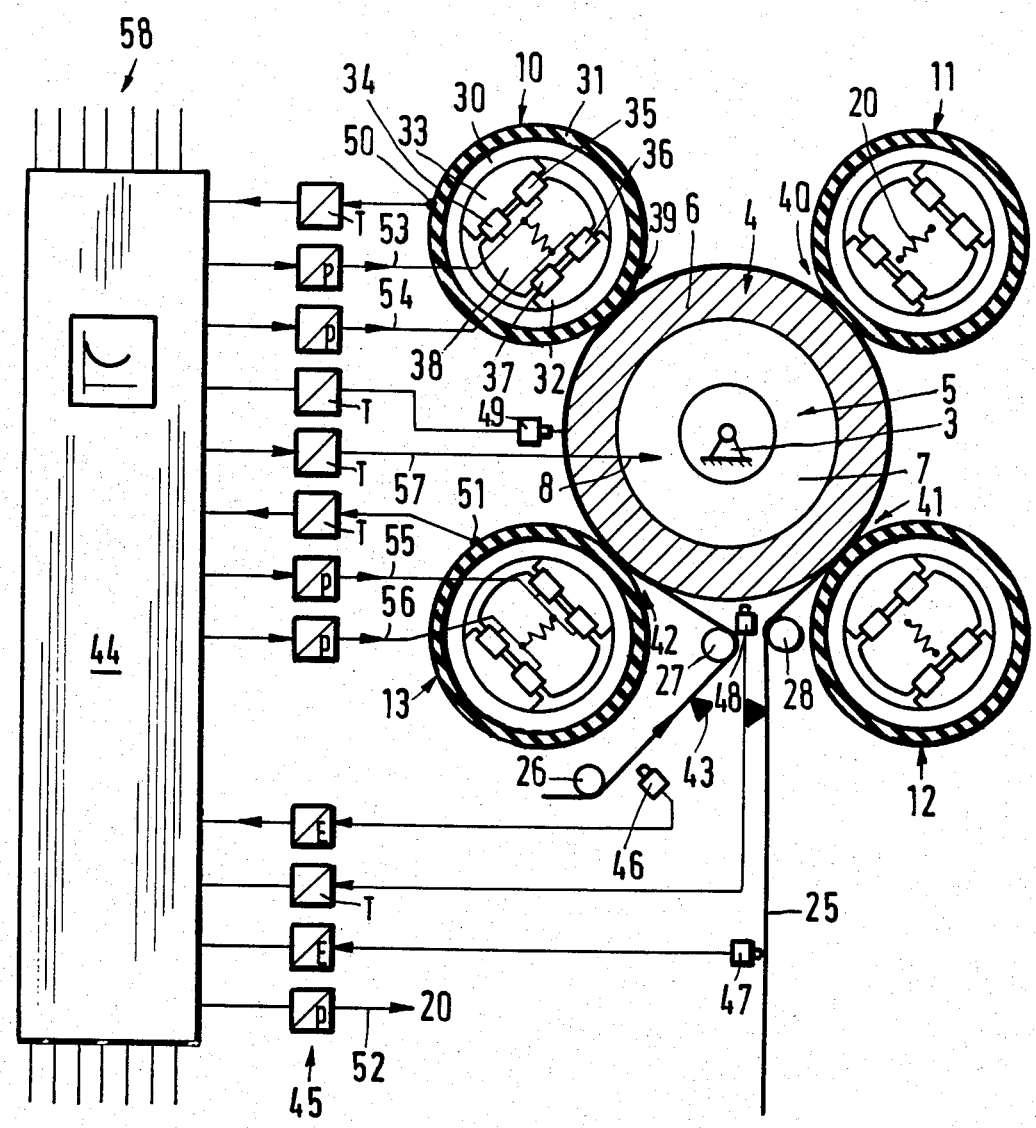
FIG. 2 is a transverse sectional view of the five calender rolls and further shows the control means for operating the devices which move the secondary rolls relative to the primary roll, for regulating the heating action of the primary roll, and for changing the shapes of the secondary rolls.

The calender which is shown in FIGS. 1 and 2 comprises a frame 1 including two spaced-apart upright frame members 2 (only one can be seen in FIG. 1) supporting a total of five calender rolls 4, 10, 11, 12, 13, a supply reel 22 for a web 25 of magnetic audio or video tape, and a takeup reel 24 for the treated web. The end portions of the shaft of the main or primary calender roll 4 are mounted in bearings 3 which are installed in the respective frame members 2. The roll 4 is hollow and its internal chamber 7 accommodates a heating device 5 which is shown schematically in FIG. 2 and includes an inlet 8 for fresh heating medium and an outlet 9 for spent heating medium. The heating device 5 is installed in the internal chamber 7 which is defined by the cylindrical shell or rim 6 of the primary roll 4.

The secondary calender rolls 10, 11, 12 and 13 are at least substantially equidistant from each other and their axes are parallel to the axis of the primary roll 4. The end portions of the secondary rolls 10 to 13 are mounted in bearings 14 which, in turn, are installed in holders 15. The holders 15 are mounted on levers 17 and have arresting means 16 which can releasably lock the respective bearings 14. Each lever 17 is pivotable relative to the respective frame member 2 about the axis of a pivot member 18 which is parallel to the primary roll 4, and each of the levers 17 can be pivoted about the axis of the corresponding pivot member 18 by a fluid-operated (e.g., hydraulic) cylinder and piston unit 20 whose piston rod 19 is articulately connected to the corresponding lever 17 and/or to the corresponding holder 15. The levers 17 and the cylinder and piston units 20 constitute means for moving the respective secondary calender rolls 10 to 13 relative to the primary calender roll 4 in order to thereby change the pressure upon the web 25 which is trained over the primary roll 4 between a first fixed guide roller 27 and a second fixed guide roller 28 in such a way that the magnetic film 43 which coats one side of the web 25 contacts the peripheral surface of the primary roll 4 but is out of contact with the secondary rolls 10 to 13 as well as with the guide rollers 26, 27 and two additional guide rollers 28, 29. The rollers 26 to 29 are mounted in the frame 1 and guide the web 25 in such a way that the magnetic film carrying side of the web has two convex portions in the regions of the guide rollers 27 and 28, i.e., upstream and downstream of that predetermined portion of the path for the web 25 which is defined by the peripheral surface of the primary roll 4.

The moving means including the fluid-operated cylinder and piston units 20 are preferably designed to lift the respective secondary rolls 10, 11, 12, 13 all the way out of any contact with the primary roll 4 or with that portion of the web 25 which is trained over the roll 4. In other words, and if the calender of FIGS. 1 and 2 is designed to treat the web by means of a total of three rolls (such as the roll 4 which is rotatable in the frame 1 about a fixed axis and two of the secondary rolls 10 to 13), the other two secondary rolls can be held in positions of readiness to move into engagement with the running web 25 only if and when necessary, e.g., to act upon the web in lieu of a normally used secondary roll which must be lifted off the primary roll 4 for the purpose of inspection, replacement or repair. The force with which the secondary rolls 10 to 13 can bear against the web portion overlying the adjacent part of the peripheral surface of the primary roll 4 is preferably adjustable within a wide range so that the smoothing and equalizing action of the calender can be selected practically at will in order to ensure an optimal treatment of the web 25.

The supply reel 22 for a roll of fresh web 25 is mounted in bearings 21 which are carried by the frame members 2 upstream of the guide roll 28, as considered in the direction of advancement of the web 25, and the takeup reel 24 (which can be said to constitute or form part of a means for advancing the web 25 along an elongated path including an arcuate portion surrounding the major part of the peripheral surface of the primary calender roll 4) is mounted in similar bearings 23 provided on the frame members 2 downstream of the last guide roller 29. The guide rollers 26 to 29 are idlers whose end portions are journalled in the frame members 2.

As shown in FIG. 2, each of the secondary calender rolls 10, 11, 12 and 13 comprises a deformable hollow cylindrical shell or rim 30 which is surrounded by a viscoelastic layer 31 of natural or synthetic material. Each of the secondary calender rolls further comprises a rigid carrier 38 whose end portions are mounted in the respective bearings 14 and which carries two rows of hydrostatic supporting elements 32 and 33 for the deformable shell 30 of the corresponding secondary calender roll. The hydrostatic supporting elements 33 are movable radially of the respective carrier 38 by pairs of hydraulic motors 34, 35 and the hydrostatic supporting elements 32 are movable radially of the respective carrier 38 by pairs of hydraulic motors 36, 37. This renders it possible to alter the pressure between the peripheral surface of the primary roll 4 and selected portions of the peripheral surfaces of the elastomeric layers 31, as considered in the axial direction of the respective secondary calender rolls. Reference may be had to commonly owned U.S. Pat. Nos. 4,497,246; 4,290,353; 4,328,744; 4,376,330; 4,394,793 and 4,425,489 which fully disclose the manner in which selected axially spaced-apart portions of the shell of a calender roll can be biased against the neighboring calender roll or rolls with a variable force. Each of the carriers 38 is non-rotatably mounted in the respective pair of bearings 14.

The primary calender roll 4 and the secondary calender rolls 10, 11, 12 and 13 respectively define four spaced-apart nips 39, 40, 41 and 42 which are parallel with the fixed axis of the primary roll 4 and through which the web 25 advances on its way from the guide roller 27 toward the guide roller 28 in such a way that the magnetic film 43 faces and contacts the peripheral surface of the roll 4. Thus, the magnetic film 43 is heated in each and every part of that (predetermined) portion of the path of the web 25 wherein the web contacts the peripheral surface of the primary calender roll 4. As shown in FIG. 2, the web 25 preferably contacts the major part (more than 75 percent) of the peripheral surface of the metallic shell 6 of the primary calender roll 4. The magnetic film 43 does not contact any of the secondary calender rolls 10 to 13 and such film is also held out of contact with the guide rollers 26 to 29.

FIG. 2 shows a preferably computerized control system 44 which regulates the bias of the secondary calender rolls 10 to 13 upon the running web 25 in the corresponding nips 39, 40, 41 and 42 and which also regulates the temperature of the cylindrical shell or rim 6 of the primary calender roll 4. The control system 44 includes a set of transducers 45 some of which receive signals from the calender. The remaining transducers transmit control signals from the system 44 to the corresponding constituents of the calender. Certain transducers 45 receive signals from sensors 46 and 47 which are respectively adjacent to the magnetic film 43 upstream of the guide roller 27 and downstream of the guide roller 28 and each of which can comprise a full battery of discrete sensors each arranged to monitor a specific characteristic E of the adjacent portion of the running web 25 at a selected location between the two marginal portions of the web. For example, the characteristic E can be indicative of the smoothness of the respective portion of the magnetic film 43 at the corresponding side of the running web 25.

An additional sensor 48 is provided to monitor the temperature at the peripheral surface of the shell 6 of the primary calender roll 4 in the region between the guide rollers 27 and 28, and a further sensor 49 is provided to monitor the temperature of the running web 25 between the two foremost nips 42 and 39. Two further sensors 50 and 51 are provided to monitor the temperatures of the peripheral surfaces of elastomeric layers 31 of the secondary calender rolls 10 and 13. Additional sensors (not specifically shown) are provided to monitor the temperatures of the peripheral surfaces of elastomeric layers 31 forming part of the secondary calender rolls 11 and 12.

Conduits 52 (only one shown) are provided to supply hydraulic fluid to the cylinders of the fluid-operated cylinder and piston units 20 for the secondary calender rolls 10 to 13 at a pressure which is selected by the control system 44 upon evaluation of information which the control system receives from various sensors as well as from one or more sources of reference signals which transmit signals by way of the inputs 58 shown in the upper left-hand portion of FIG. 2.

Conduits 53 and 54 are provided to supply pressurized hydraulic fluid to the corresponding hydraulic motors 34-35 and 36-37 in the shell 30 of the secondary calender roll 10, and conduits 55, 56 are provided to supply pressurized hydraulic fluid to the corresponding motors 34-35 and 36-37 of the secondary calender roll 13. Additional conduits (not specifically shown) are provided to supply hydraulic fluid to the motors in the shells of the secondary calender rolls 11 and 12. Each of the conduits 53, 54, 55, 56 comprises a plurality of discrete pipes or hoses, at least one for each of the respective motors in the roll 10 or 13. It is also possible to employ a common pipe or hose for a group or set of two or more neighboring motors 34, 35, 36 or 37. Reference may be had to the aforementioned commonly owned U.S. Pat. Nos. 4,328,744 and 4,394,793.

The inlet 8 of the heating unit 5 in the primary calender roll 4 receives a flowable heating medium by way of a further conduit 57 at a rate which is determined by the evaluating circuit of the control system 44.

The aforementioned inputs 58 of the control system 44 receive signals which are supplied by suitable sources of reference signals (e.g., adjustable potentiometers) and which can denote the desired or desirable relationships between the temperatures and pressures, between various characteristics of the running web 25 and the corresponding optimum pressures to be applied by one or more secondary calender rolls, and/or between other parameters which can exert a beneficial influence upon the smoothness, thickness and/or other characteristics of the web 25 and/or its magnetic film 43.

Each of the sensors 46, 47, 48, 49, 50 and 51 preferably includes a full row of discrete or interconnected sensors each of which is designed to monitor a selected portion of the web 25, primary roll 4 and secondary rolls, as considered in the axial direction of the calender rolls. This enables the control system 44 to transmit signals to appropriate motors 34, 35, 36 and/or 37 in order to change the configuration of the corresponding portion or portions of the respective shells 30 and hence the pressure upon selected longitudinally extending portions of the web 25.

The guide roller 26 and/or 27 may be heated so as to effect a preliminary heating of the web 25 ahead of the location of initial contact with the external surface of the shell 6. Furthermore, and as shown in FIG. 2, the guide roller 27 is preferably positioned in such a way that the web 25 contacts the peripheral surface of the shell 6 upstream of the foremost nip 42, as considered in the direction of advancement of the web. The calender of FIGS. 1 and 2 can be modified by replacing the elastomeric layer 31 of the foremost secondary calender roll 13 with a hard layer. Furthermore, and as shown in FIG. 2, the guide rollers 27 and 28 are designed to impart to the film 43 a convex shape in the regions immediately upstream of the location of initial contact with the shell 6 and immediately downstream of the location where the contact between the web 25 and the shell 6 is terminated.

The operation of the calender of FIGS. 1 and 2 is or can be as follows: Signals which are transmitted by the sensor 46 are processed by the control system 44 to generate a signal or a series of signals denoting a desirable combination of the temperature of the primary calender roll 4 and the pressure which is to be applied by the fluid-operated cylinder and piston units 20 to the corresponding secondary calender rolls 10 to 13. Such signals can be modified in dependency on the intensity or other characteristics of signals which are generated by the sensor 47. A circuit including the sensor 48 serves to ensure that the actual temperature at the peripheral surface of the shell 6 of the primary calender roll 4 matches the selected optimum temperature. Additional circuits are provided to ensure that the force with which the secondary calender rolls 10 to 13 bear upon the adjacent portions of the running web 25 matches a preselected optimum force or a force which is necessary to ensure that the finished product will exhibit desired characteristics. Furthermore, signals which are generated by the sensors 46, 47 and 49 influence the forces which are applied by the motors 34 to 37 in the shells 30 of the secondary rolls in such a way that the quality of the web 25 is uniform all the way from the one to the other marginal portion of the web. It will be recalled that the supporting elements 32 and 33 form rows which extend in the axial direction of the respective secondary rolls and that each such supporting element or certain groups of such supporting elements can be adjusted independently of the others in order to deform the respective portions of the shells 30 in a manner which is required to exert appropriate pressure upon the corresponding longitudinally extending part or parts of the running web 25. Thus, the force with which the secondary calender roll 10, 11, 12 and/or 13 bears upon the adjacent portion of the running web 25 in the corresponding nip 39, 40, 41 and/or 42 need not be uniform but can vary from increment to increment, as considered in the longitudinal direction of the respective nip. Variations of pressure and fulling entail the development of different temperatures in different longitudinally extending portions of the running web.

The control system 44 may be of the type known as LSI 11/23 manufactured by Digital Equipment. The sensors 46 and 47 may be of the type known as KL (manufactured by the firm Lippke, Neuwied, German Federal Republic) and the temperature sensors 48, 49, 50 and 51 may be of the type known as KT 17 (manufactured by the firm Heimann GmbH, Wiesbaden, German Federal Republic).

The presently preferred construction of the secondary calender rolls 10, 11, 12 and 13 is identical with or similar to that of calender rolls which are disclosed in the commonly owned copending patent application Ser. No. 565,282 filed Dec. 27, 1983, now U.S. Pat. No. 4,520,723.

It is possible to increase the number of secondary calender rolls to more than four or to reduce the number of secondary rolls to two or three without departing from the spirit of the invention. Furthermore, and as mentioned above, the effective number of secondary rolls can be varied by lifting one or more of the total number of secondary rolls away from contact with that portion of the running web which is in actual contact with the peripheral surface of the primary calender roll 4. Thus, the calender can be furnished with an extra or spare secondary roll for the express purpose of using such extra or spare roll only to achieve certain effects or to avoid lengthy interruptions of operation if one of the remaining secondary rolls requires replacement, cleaning, inspection and/or repair. For example, the calender which is shown in FIGS. 1 and 2 can be operated with the secondary calender rolls 10, 12 and 13. The roll 11 is then normally lifted above and away from the adjacent portion of the running web 25 and is lowered into actual contact with the web only when one of the normally used (regular) secondary rolls (e.g., the roll 10) requires inspection, repair, cleaning or replacement. It may be desirable to subject the roll 11 to a preliminary heating action prior to actual lowering of its elastomeric layer 31 into contact with the running web. The movements of a selected secondary roll or rolls into and from contact with the running web do not adversely influence the operation of the calender because the guide rollers 26 to 29 continue to maintain a predetermined length of the running web 25 in requisite contact with the peripheral surface of the metallic rim or shell 6 of the primary calender roll 4.

Figure 3:
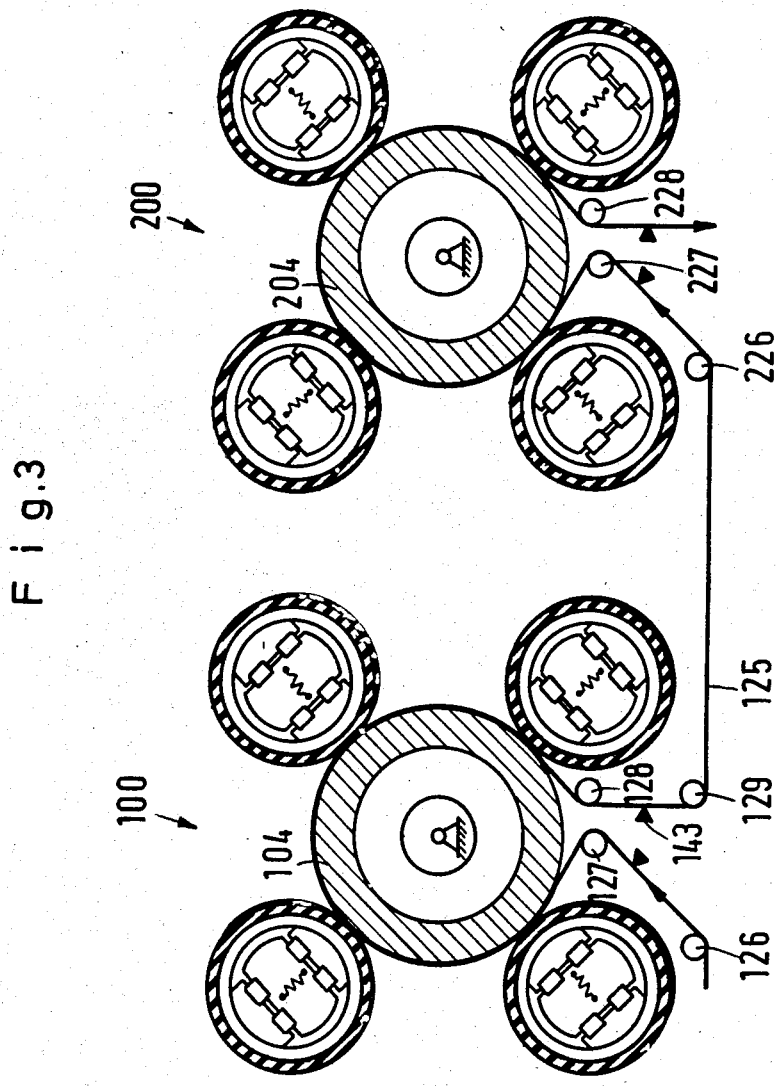
FIG. 3 is a schematic transverse sectional view of a portion of a modified calender with two primary calender rolls and two sets of four secondary calender rolls each.

FIG. 3 shows a portion of a modified calender with a first primary calender roll 104 corresponding to the roll 4 of FIGS. 1 and 2, a first set of secondary calender rolls corresponding to the calender rolls 10 to 13 of FIGS. 1 and 2, a first set of guide rollers 126 to 129 corresponding to the guide rollers 26 to 29 of FIGS. 1 and 2, a second primary calender roll 204, a second set of four secondary calender rolls cooperating with the roll 204 in the same way as the rolls 10 to 13 cooperate with the roll 4 of FIGS. 1 and 2, and additional guide rollers 226, 227, 228 which ensure that the running web 125 is trained around the major part of the peripheral surface of the second primary roll 204. The structure of FIG. 3 actually constitutes two discrete calenders 100 and 200 which are disposed in series and wherein the guide rollers are positioned in such a way that the magnetic film 143 on the web 125 contacts the peripheral surfaces of the heated primary rolls 104, 204 but is held out of contact with the secondary calender rolls as well as with the guide rollers 126 to 129 and 226 to 228.

It is possible to deactivate one of the calenders 100, 200 if the nature of the web is such that the treatment in a single calender suffices to achieve the desired degree of smoothness, uniform thickness and/or other desirable characteristics. Analogously, the illustrated calenders 100 and 200 can be placed in series with one or more additional calenders.

It will be seen that, in each of the improved calenders, the magnetic film is in contact with a single (primary) calender roll and is held out of contact with the secondary calender rolls as well as out of contact with the guide means. Moreover, the running web is heated in each and every portion of the path wherein its magnetic film contacts the primary calender roll. The just described treatment of the web exhibits a number of important advantages. Thus, the magnetic film is much less likely to be damaged since it need not be moved into and out of repeated contact with a calender roll. This contributes to superior quality of the treated web. Moreover, and since the web is heated all the way between the point of initial contact with a primary roll and the point where such contact is terminated, it is possible to transmit to the web large quantities of thermal deforming energy without excessive heating of the primary roll and/or the web. This also contributes to superior quality of the finished product. Uninterrupted contact between the external surface of the primary roll and a relatively long portion of the running web, coupled with heating of the entire portion of the web which is in contact with the primary roll, ensures that the temperature of the web is uniform all the way from the one to the other marginal portion. Such uniform heating of the web all the way between its marginal portions is not possible in conventional calenders wherein the web is heated only in the nip or nips and is subjected to the cooling action of surrounding air on its way from one nip to the next. As a rule, the surrounding air effects a much more pronounced cooling of the marginal portions than of the central portion of the web when the web is repeatedly disengaged from the calendering rolls. Uniform heating of the web across its width ensures that the quality of the treated web is uniform all the way from the one to the other marginal portion.

Another important advantage of the improved method and calender is that the pressure which is exerted upon the web in each of the two or more nips adjacent to a primary calender roll can be altered (increased or reduced or terminated) independently of the pressure or pressures which is or are applied in the other nip or nips. In conventional calenders, the pressure is altered in the nip between the two uppermost rolls of a series of superimposed rolls, and the thus increased or reduced pressure is then propagated to the nip or nips below the uppermost nip. The pressure in the nips of rolls in conventional calenders is often dependent on the weight of the roll or rolls at a level above a particular nip, and such pressure cannot be regulated at all or is regulatable only within a narrow range. It has been found that the ability of the improved calender to alter the pressure in one or more nips independently of the pressure or pressures in the other nip or nips can be used with advantage to greatly enhance the quality of the web. Moreover, such adjustability of the pressure in one or more nips renders it possible to treat the web with a surprisingly high degree of predictability and reproducibility even if the web is advanced at a very high speed.

The feature that the web is or can be heated prior to coming in contact with a primary calender roll (e.g., by heating the guide roller 26 and/or 27 in the calender of FIGS. 1 and 2) also contributes to more satisfactory quality of the finished product. Thus, preliminary heating ensures that the web receives a predetermined amount of deforming energy prior to reaching the foremost nip, as considered in the direction of advancement of the web. With reference to FIG. 3, the primary calender roll 104 can be said to constitute a means for preheating successive increments of the web 125 before such increments reach the peripheral surface of the second primary calender roll 204. Preheating of the web ahead of the location of initial contact with a primary calender roll renders it possible to reduce the force which is applied in the nips and/or to reduce the number of nips (i.e., to reduce the number of active or regular secondary calender rolls). This not only reduces the cost of the treatment and of the calender but also results in improved quality of the web because the latter need not be subjected to a substantial number of pronounced compressing actions. The feature that the magnetic film of the web does not contact the guide rollers and/or other types of guide members for the web also enhances the quality of the web because the magnetic film is not contacted by and moved out of contact with a substantial number of parts but only with the primary calender roll or rolls. This is achieved in a simple way by guiding the web so that its film 43 or 143 is convex in the region of each guide roller, i.e., that the film is located at the side facing away from the nearest portion of the guide roller.

The feature that the shell of each primary calender roll is hard and has a smooth web-contacting surface contributes to superior quality of the finished product, i.e., the smoothness of the exposed side of the magnetic film is very satisfactory.

The feature that at least one of the secondary calender rolls which cooperates with a particular primary roll has a resilient or elastic outer layer is desirable and advantageous because this enables the apparatus to function as a supercalender. Each layer is stressed only once during each revolution of the respective secondary roll. Such reduction of the frequency at which the stressing of the calender rolls varies entails a reduction of specific stressing of the surfaces of the rolls and contributes to longer useful life and a higher overall number of revolutions of the calender rolls.

The utilization of secondary calender rolls with deformable shells and rows of adjustable supporting elements renders it possible to regulate the treatment of different longitudinally extending portions of the running web with a very high degree of accuracy and to thus ensure that the quality of the finished product is more uniform all the way from the one to the other marginal portion of the web. The force with which the supporting elements bear against the adjacent portions of the corresponding deformable shell is preferably dependent upon the temperature in the corresponding portion of the running web, in the corresponding portion of the adjacent primary roll and/or in the corresponding portion of the respective elastomeric layer. Such temperature-dependent regulation of the shape of the corresponding portions of the deformable shells of the secondary rolls has been found to ensure a highly predictable and satisfactory treatment of the running web. One of the reasons is that the rise in temperature of the elastomeric layer 31 on a secondary calender roll (such rise in temperature is attributable to deformation of the layer 31 when it comes into contact with the running web) can be taken into consideration in determining the force with which individual supporting elements or groups of supporting elements are moved relative to their carrier in order to change the shape of the adjacent portion or portions of the respective shell 30. The control system 44 can select any one of a number of different pressure-temperature combinations to thereby change the pressure in a particular nip and hence the extent of deformation and the extent of heating of the respective elastomeric layer 31 in order to ensure that the treatment of the running web will be uniform all the way between the two marginal portions of the web.

The mounting of the foremost guide roller or rollers in such a way that the web is caused to contact the primary roll ahead of the foremost nip is often desirable and advantageous because this ensures that the web is preheated (even in the absence of heating of the guide rollers which precede the foremost nip) and is more readily treated by the foremost secondary roll.

The reason for the desirability of using one or more spare secondary rolls (see also the aforementioned U.S. Pat. No. 4,497,246) is that the elastomeric layers of the secondary rolls must be refinished at certain intervals. The provision of one or more spare or extra secondary rolls ensures that the calender need not be idled during such treatment of the elastomeric layer on a particular secondary roll.

An advantage of a calender wherein the diameter of the primary roll exceeds the diameters of the secondary rolls is that a substantial length of the running web is held in uninterrupted contact with and is continuously heated by the primary roll. As mentioned above, longer-lasting contact between the web and the heated primary roll renders it possible to apply to the web a requisite amount of thermal energy even if the primary roll is not heated to an elevated temperature. An additional advantage of a larger-diameter primary roll is that the magnetic film of the web need not be subjected to pronounced flexing which reduces the likelihood of damage to the film. Still further, the utilization of a large-diameter primary roll contributes to the width of the nips (as considered in the circumferential direction of the primary roll) and to a reduction of pressure peaks in the nips.

The utilization of one secondary roll which has a hard peripheral layer is often desirable and advantageous in order to enable the calender to impart to the web a desired thickness with an extremely high degree of accuracy. If the calender employs a secondary roll with a hard peripheral layer, such secondary roll is preferably the foremost secondary roll, as considered in the direction of advancement of the web.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of calendering a web of the type having a magnetic film at one side thereof, particularly of calendering an audio or video recording tape, comprising the steps of advancing the web longitudinally in a predetermined direction and along an elongated path; training the web over at least one primary calendering roll in a predetermined portion of the path so that the magnetic film of successive elongated increments of the running web contacts the primary roll; establishing at least two-spaced-apart nips between the primary roll and discrete secondary rolls so that spaced-apart portions of said increments are compelled to advance through and are compressed in such nips, the upstream nip of said nips constituting the foremost compressing nip along said path; heating the primary roll so that the latter exchanges heat with successive increments of the running web including those portions of the increments which extend between the nips; and heating the web ahead of said upstream nip, the training step including maintaining the web in substantially uninterrupted contact with the primary roll in the portion of said path between said nips.

2. The method of claim 1, further comprising the step of regulating the pressure which is applied to the running web in at least one of the nips independently of the pressure in each other nip.

3. The method of claim 1, wherein said training step includes guiding the web along at least one additional portion of said path wherein the one side of the web is convex.

4. The method of claim 1, said path having a downstream end at which said path terminates; and wherein the advancing and training steps are performed in such a manner that, in the portion of said path between said upstream nip and said downstream end, the magnetic film contacts mechanical devices only during heating and compression.

5. The method of claim 4, wherein the advancing and training steps are performed in such a manner that, along the entire length of said path, the magnetic film contacts mechanical devices only during heating and compression.

6. The method of claim 1, wherein the step of heating the web comprises contacting the web with the primary roll at a preselected location of said path ahead of said upstream nip.

7. The method of claim 6, wherein the training step comprises maintaining the web in substantially uninterrupted contact with the primary roll between said preselected location and said upstream nip.

8. The method of claim 1, wherein said secondary rolls are devoid of heating means.

9. A calender for a web of the type having a magnetic film at one side thereof, particularly for calendering an audio or video recording tape, comprising a frame; a primary calendering roll mounted in said frame for rotation about a fixed axis; at least two secondary calender rolls rotatably supported by said frame and defining with said primary roll spaced-apart compressing nips; means for advancing the web in a predetermined direction and along an elongated path which extends along the periphery of said primary roll and through said nips, the upstream nip of said nips constituting the foremost compressing nip along said path, and said advancing means being arranged to advance the web in such a way that the running web contacts the primary roll ahead of said upstream nip and is maintained in substantially uninterrupted contact with said primary roll in the portion of said path between said nips; means for moving at least one of said secondary rolls with reference to said primary roll so as to alter the pressure upon the running web in the respective nip; and means for heating said primary roll so that the latter exchanges heat with the running web in the entire portion of said path between said nips.

10. The calender of claim 9, wherein said primary roll has a hard rim with a smooth web-contacting peripheral surface.

11. The calender of claim 9, wherein at least one of said secondary rolls has an elastic web-contacting layer.

12. The calender of claim 9, wherein at least one of said secondary rolls comprises an elongated carrier, a deformable hollow cylindrical shell surrounding the carrier and having a web-contacting external surface, at least one row of displaceable supporting elements disposed between said shell and said carrier, and means for displacing said supporting elements relative to said carrier to thereby influence the shape of the external surface of said shell.

13. The calender of claim 12, wherein said displacing means includes fluid-operated motors.

14. The calender of claim 12, further comprising control means for operating said displacing means individually and/or in groups of two or more.

15. The calender of claim 14, wherein the cylindrical shell of said one secondary roll has an elastomeric peripheral layer including said web-contacting external surface, said control means including means for monitoring the temperature of said elastomeric layer at a plurality of locations which are spaced apart from one another, as considered in the axial direction of said one secondary roll, the supporting elements of said one row being adjacent to such locations and said control means including means for actuating the corresponding displacing means in dependency on the variations of monitored temperature at the respective locations.

16. The calender of claim 9 wherein said advancing means includes at least one guide roll arranged to maintain the web in contact with the primary roll ahead of said upstream nip.

17. The calender of claim 9, wherein said advancing means includes a plurality of rotary guide members which contact the other side of the web.

18. The calender of claim 9, further comprising at least one additional secondary roll and means for moving said additional secondary roll relative to said primary roll so as to establish or terminate the establishment of an additional nip for the passage of the web therethrough.

19. The calender of claim 9, wherein the diameter of said primary roll exceeds the diameters of said secondary rolls.

20. The calender of claim 9, wherein said secondary rolls include a foremost roll, as considered in said direction, and said foremost roll has a hard rim with a web-contacting external surface.

21. The calender of claim 9, wherein said advancing means is arranged such that the magnetic film contacts said primary roll.

22. The calender of claim 21, said advancing means including a take-up element for the web; and wherein said advancing means is arranged such that, in the portion of said path between said upstream nip and said take-up element, the magnetic film contacts mechanical devices only during heating and compression.

23. The calender of claim 22, wherein said advancing means is arranged such that, along the entire length of said path, the magnetic film contacts mechanical devices only during heating and compression.

24. The calender of claim 21, further comprising a second primary roll mounted in said frame for rotation about a fixed axis, at least two additional secondary rolls rotatably supported by said frame and defining with said second primary roll spaced-apart additional nips, a second portion of said path extending along the periphery of said second primary roll and through said additional nips so that the second primary roll contacts the magnetic film, means for moving at least one of said additional secondary rolls with reference to said second primary roll so as to alter the pressure upon the running web in the respective additional nip, and means for heating said additional primary roll so that the latter exchanges heat with the running web in the entire second portion of said path including the region or regions between said additional nips.

25. The calender of claim 24, wherein the number of secondary rolls which are adjacent said first mentioned primary roll matches the number of said additional secondary rolls.

26. The calender of claim 9, further comprising computerized means for regulating the heating action of said primary roll and the bias of said one secondary roll upon the web in the respective nip.

27. The calender of claim 9, wherein said secondary rolls are devoid of heating means.

* * * * *